United States Patent [19]

Takagi

[11] Patent Number: 5,291,365
[45] Date of Patent: Mar. 1, 1994

[54] POWER SUPPLY WITH OVERVOLTAGE PROTECTION CIRCUIT

[75] Inventor: Nobutomo Takagi, Nagoya, Japan
[73] Assignee: Nippondenso Co., Ltd., Kariya, Japan
[21] Appl. No.: 964,632
[22] Filed: Oct. 22, 1992
[30] Foreign Application Priority Data Oct. 22, 1991 [JP] Japan .................................. 3-274175

[51] Int. Cl.⁵ .............................................. G05F 1/569
[52] U.S. Cl. ...................... 361/56; 307/10.2; 323/231; 323/313; 361/91
[58] Field of Search ................. 361/56, 91, 111; 323/226, 231, 313; 307/10.2; G05F 1/569

[56] References Cited

U.S. PATENT DOCUMENTS 4,476,426 10/1984 Kishimoto et al. .................. 323/226
4,736,271 4/1988 Mack et al. ............................ 361/91

OTHER PUBLICATIONS

Practical Circuit for Electrical Power Source (English translation attached), (undated).
Improvement in Electrostatic Breakage Resistivity (English translation attached), (undated).

Primary Examiner—William H. Beha, Jr.
Attorney, Agent, or Firm—Cushman, Darby & Cushman

[57] ABSTRACT

First, second, and third power supply lines are separate from each other. A power supply circuit receives electric power from the first power supply line, and generates a given power supply voltage from the received electric power and outputs the generated power supply voltage to the third power supply line. An electronic circuit is connected to the third power supply line to be activated by the power supply voltage. The electronic circuit has an input section for receiving an input signal from the second power supply line. A protective circuit provided in the electronic circuit leaks a current from the input section of the electronic circuit toward the third power supply line when a voltage of the input signal exceeds the power supply voltage. A reference voltage generating device serves to generate a first reference voltage in the presence of the electric power fed from the first power supply line to the power supply circuit, and serves to generate a second reference voltage in the absence of the electric power fed from the first power supply line to the power supply circuit. The second reference voltage is lower than the first reference voltage. A voltage limiting device being responsive to the first and second reference voltages serves to limit a voltage of the third power supply line to below a level approximately equal to the first or second reference voltage.

4 Claims, 4 Drawing Sheets

1

POWER SUPPLY WITH OVERVOLTAGE PROTECTION CIRCUIT

BACKGROUND OF THE INVENTION

This invention relates to a power supply voltage control apparatus.

Some electronic circuits using C-MOS devices are equipped with a special arrangement for protecting the C-MOS devices. Specifically, when the voltage of an input signal to a C-MOS device exceeds a power supply voltage, the protective arrangement leaks a current from an input signal line to a power supply line to prevent an excessive increase in the voltage of the input signal and thereby to protect the C-MOS device from the high input signal voltage.

Such a leak current tends to cause an unwanted increase in the power supply voltage. It is known to provide a Zener diode at a suitable location within the electronic circuit to prevent the unwanted increase in the power supply voltage.

As will be explained later, an electronic circuit equipped with a protective arrangement and a Zener diode tends to perform unexpected and undesirable operation under certain conditions.

SUMMARY OF THE INVENTION

It is an object of this invention to provide an improved power supply voltage control apparatus.

A first aspect of this invention provides a power supply voltage control apparatus comprising first, second, and third power supply lines being separate from each other; a power supply circuit, being connected between the first power supply line and the third power supply line and receiving electric power from the first power supply line, for generating a given power supply voltage from the received electric power, and for outputting the generated power supply voltage to the third power supply line; an electronic circuit being connected to the third power supply line and receiving the power supply voltage from the third power supply line to be activated by the received power supply voltage, the electronic circuit having an input section for receiving an input signal from the second power supply line, the electronic circuit operating on the input signal; a protective circuit, being provided in the electronic circuit, for leaking a current from the input section of the electronic circuit toward the third power supply line when a voltage of the input signal exceeds the power supply voltage; reference voltage generating means, being connected to the first power supply line, for generating a first reference voltage in the presence of the electric power fed from the first power supply line to the power supply circuit, and for generating a second reference voltage in the absence of the electric power fed from the first power supply line to the power supply circuit, the second reference voltage being lower than the first reference voltage; and voltage limiting means, connected to the third power supply line and the reference voltage generating means to be responsive to the first and second reference voltages, for limiting a voltage of the third power supply line to below a level approximately equal to the first or second reference voltage.

A second aspect of this invention provides a power supply voltage control apparatus in a system comprising first, second, and third power supply lines being separate from each other; an electric power source connected to the first and second power supply lines; a power supply circuit, being connected between the first power supply line and the third power supply line and receiving first electric power from the electric power source via the first power supply line, for deriving a power supply voltage from the received first electric power, and for outputting the derived power supply voltage to the third power supply line; input signal generating means, being connected to the second power supply line and receiving second electric power from the electric power source, for generating an input signal from the received second electric power; an electronic circuit being connected to the third power supply line and receiving the power supply voltage from the third power supply line to be activated by the received power supply voltage, the electronic circuit having an input section connected to the input signal generating means for receiving the input signal therefrom, the electronic circuit operating on the input signal; a protective circuit, being provided in the electronic circuit, for leaking a current from the input section of the electronic circuit toward the third power supply line when a voltage of the input signal exceeds the power supply voltage; the power supply voltage control apparatus comprising means for, in cases where the power supply circuit normally operates to generate the power supply voltage, limiting the power supply voltage to below a first given level even when the protective circuit leaks a current from the input section of the electronic circuit toward the third power supply line; and means for, in cases where the power supply circuit fails to generate the power supply voltage, limiting a voltage at the third power supply line to below a second given level even when the protective circuit leaks a current from the input section of the electronic circuit toward the third power supply line, the second given level being lower than the first given level.

DESCRIPTION OF THE PREFERRED EMBODIMENTS

Prior art apparatus will now be described for a better understanding of this invention.

Figure 1:
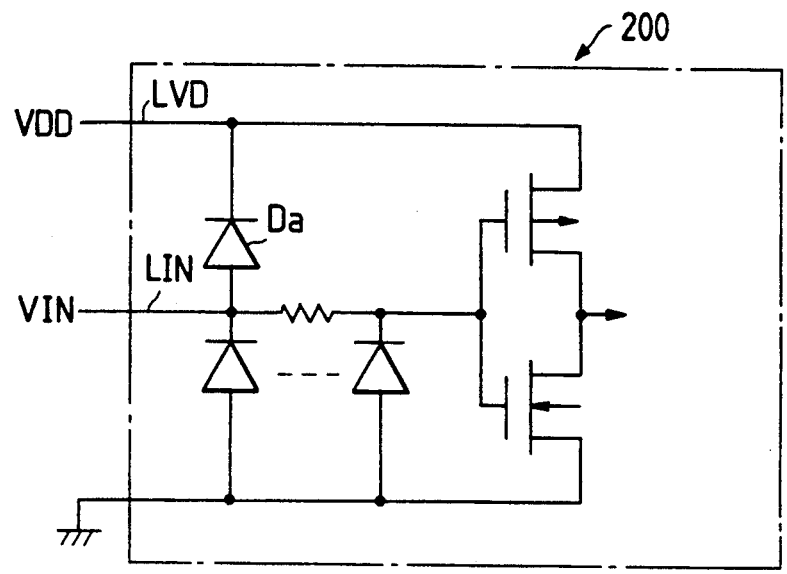
FIG. 1 is a schematic diagram of a first prior art apparatus including a C-MOS device and a protective circuit therefor.

FIG. 1 shows a first prior art apparatus including a C-MOS device 200. A stabilized power supply line LVD and an input signal line LIN are connected to the C-MOS device 200. The C-MOS device 200 receives a stabilized power supply voltage VDD via the power supply line LVD. The C-MOS device 200 is activated by the power supply voltage VDD. In addition, the C-MOS device 200 receives an input signal VIN via the input signal line LIN.

In the prior art apparatus of FIG. 1, a protective diode Da is connected between the power supply line LVD and the input signal line LIN. When the voltage of the input signal VIN exceeds the power supply voltage VDD by a given level (corresponding to the anode-cathode threshold voltage of the protective diode Da) due to an unwanted phenomenon such as a surge, the protective diode Da leaks a current from the input signal line LIN to the power supply line LVD to limit the voltage of the input signal and thereby to protect the C-MOS device 200.

However, such a leak current tends to cause an unwanted increase in the power supply voltage VDD which might result in abnormal operation of the C-MOS device 200 or damage of the C-MOS device 200.

Figure 2:
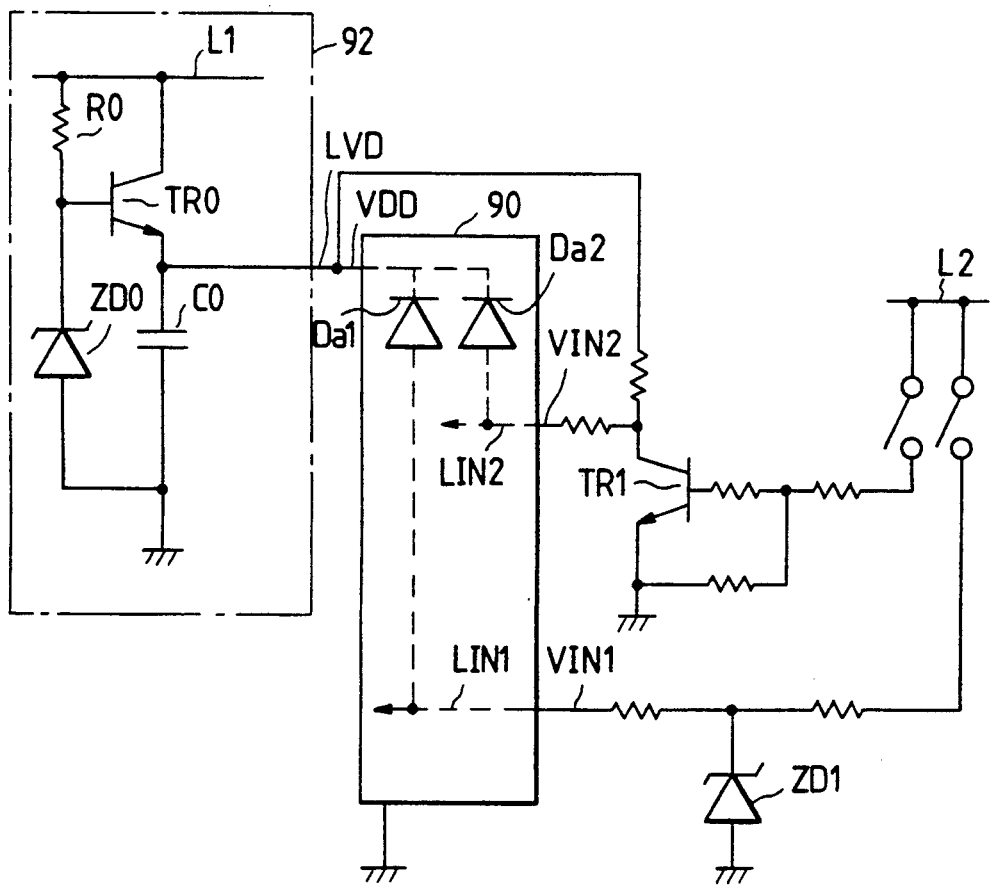
FIG. 2 is a schematic diagram of a second prior art apparatus including an electronic circuit, a protective device therefor, and a power supply circuit.

FIG. 2 shows a second prior art apparatus improved over the prior art apparatus of FIG. 1. The prior art apparatus of FIG. 2 includes an electronic circuit 90 having a C-MOS device. A secondary power supply line LVD and input signal lines LIN1 and LIN2 are connected to the electronic circuit 90. The electronic circuit 90 receives a stabilized power supply voltage VDD via the secondary power supply line LVD. The electronic circuit 90 is activated by the stabilized power supply voltage VDD. The electronic circuit 90 receives input signals VIN1 and VIN2 via the input signal lines LIN1 and LIN2 respectively.

In the prior art apparatus of FIG. 2, the electronic circuit 90 is provided with protective diodes Da1 and Da2. The protective diode Da1 is connected between the secondary power supply line LVD and the input signal line LIN1. The protective diode Da2 is connected between the secondary power supply line LVD and the input signal line LIN2. The function of the protective diodes Da1 and Da2 is similar to that of the protective diode Da of FIG. 1.

In the prior art apparatus of FIG. 2, a Zener diode ZD1 is connected between the input signal line LIN1 and a ground line. The Zener diode ZD1 limits the voltage at the input signal line LIN1, preventing the power supply voltage VDD from being excessively increased by a leak current through the protective diode Da1.

The prior art apparatus of FIG. 2 includes a power supply circuit 92 of the transistor-based emitter follower type. The power supply circuit 92 has a Zener diode ZD0, a resistor R0, an NPN transistor TR0, and a capacitor C0. The cathode of the Zener diode ZD0 is connected via the resistor R0 to a primary power supply line L1 subjected to a primary power supply voltage. The anode of the Zener diode ZD0 is grounded. The Zener diode ZD0 functions to provide a reference voltage at the junction between the resistor R0 and the Zener diode ZD0. The base of the transistor TR0 is connected to the junction between the resistor R0 and the Zener diode ZD0. The collector of the transistor TR0 is connected to the primary power supply line L1. The emitter of the transistor TR0 is grounded via the capacitor C0. The emitter of the transistor TR0 leads to the secondary power supply line LVD. The power supply circuit 92 derives the stabilized power supply voltage VDD from the primary power supply voltage at the primary power supply line L1. The stabilized power supply voltage VDD is given by an emitter voltage which equals the reference voltage of the Zener diode ZD0 minus the base-emitter threshold voltage (about 0.7 V) of the transistor TR0.

In the prior art apparatus of FIG. 2, the input signals VIN1 and VIN2 can be induced by a primary power supply voltage at a primary power supply line L2 which is separate from the primary power supply line L1.

In the prior art apparatus of FIG. 2, a buffer including a transistor TR1 is interposed between the primary power supply line L2 and the input signal line LIN2. The buffer is activated by the stabilized power supply voltage VDD fed via the secondary power supply line LVD. The buffer blocks a leak current which could flow to the secondary power supply line LVD from the primary power supply line L2 via the protective diode Da2.

Figure 3:
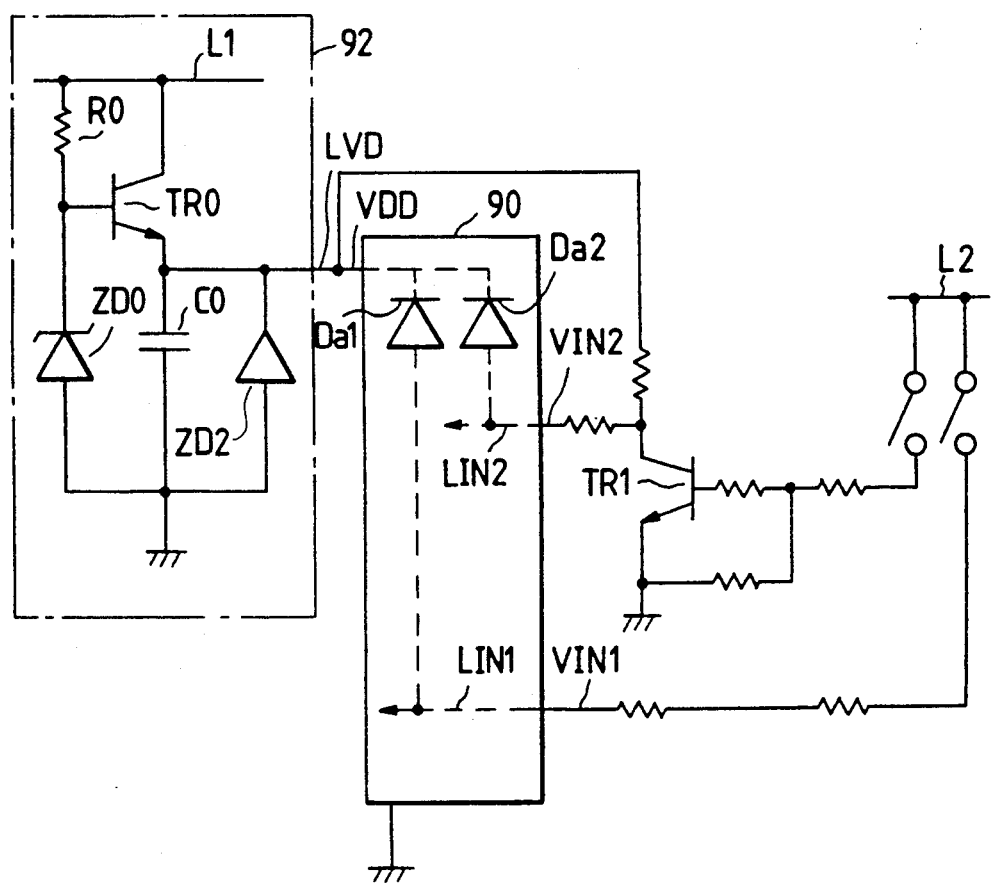
FIG. 3 is a schematic diagram of a third prior art apparatus including an electronic circuit, a protective device therefor, and a power supply circuit.

FIG. 3 shows a third prior art apparatus improved over the prior art apparatus of FIG. 1. The prior art apparatus of FIG. 3 is similar to the prior art apparatus of FIG. 2 except that the Zener diode ZD1 is omitted while a Zener diode ZD2 is connected between a secondary power supply line LVD and a ground line. The Zener diode ZD2 functions to prevent the power supply voltage VDD from being excessively increased by a leak current through a protective diode Da1 or Da2.

The prior art apparatus of FIGS. 2 and 3 have the following problem. Under conditions where the primary power supply voltage for inducing the input signals VIN1 and VIN2 remains applied to the primary power supply line L2, when the application of the primary power supply voltage to the primary power supply line L1 is interrupted to deactivate the electronic circuit 90, a current flows from the input signal line LIN1 to the secondary power supply line LVD via the protective diode Da1 so that the voltage at the secondary power supply line LVD increases. The electronic circuit 90 tends to be undesirably operated by the increased voltage at the secondary power supply line LVD. In addition, the provision of the buffer including the transistor TR1 makes the apparatus complicated.

A power supply voltage control apparatus of this invention solves the previously-mentioned problems of the prior art apparatus of FIGS. 2 and 3. Embodiments of this invention will be described hereinafter.

Figure 4:
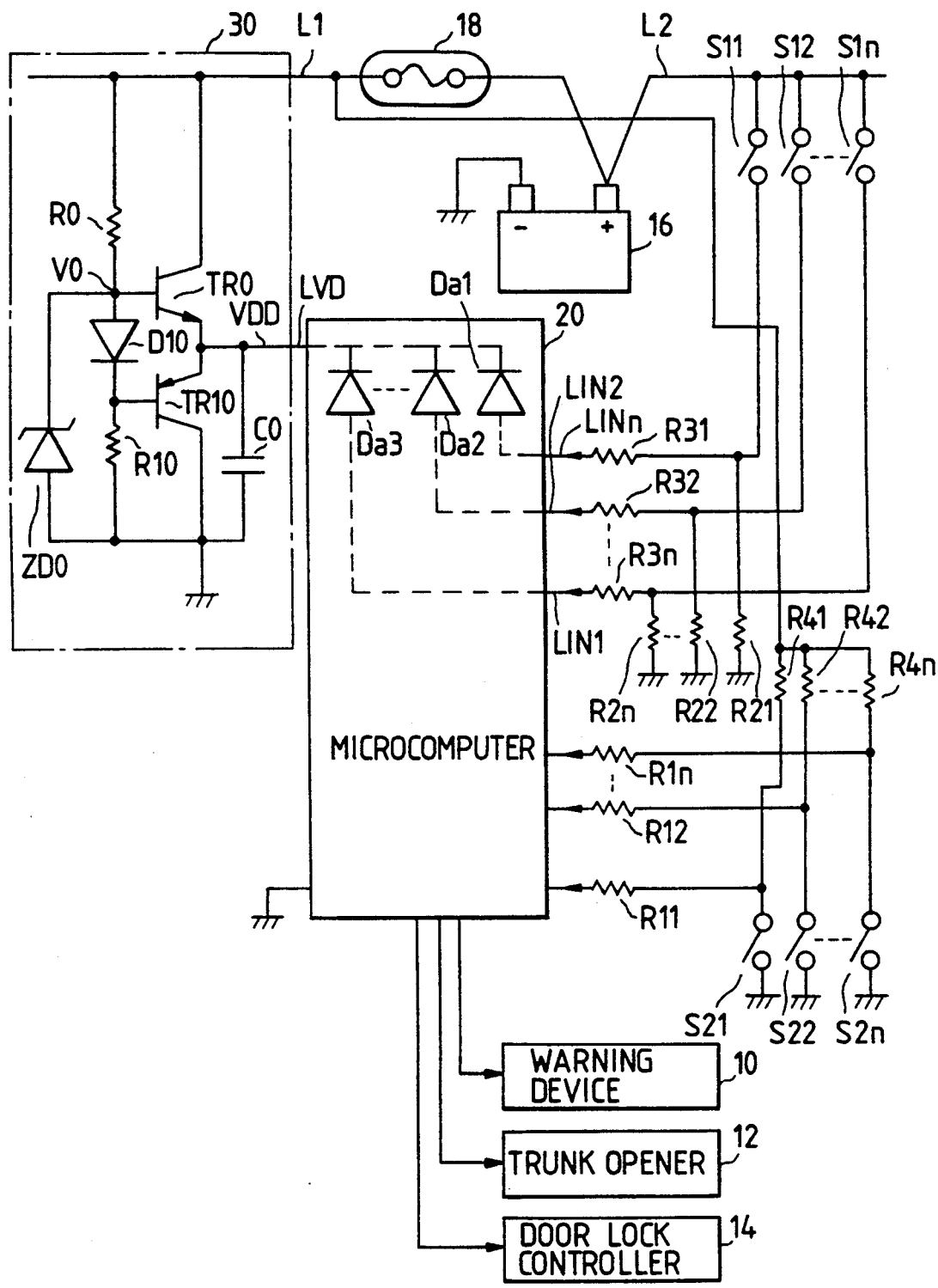
FIG. 4 is a diagram of an automotive antitheft system including a power supply voltage control apparatus according to an embodiment of this invention.

FIG. 4 shows an automotive antitheft system including a power supply voltage control apparatus according to an embodiment of this invention. The automotive antitheft system serves to generate a warning when a door, a trunk lid, or a bonnet is opened without key operation under conditions where a door key remains locked.

As shown in FIG. 4, the automotive antitheft system includes a warning device 10 and various detection switches S21, S22, ..., S2n. The warning device 10 is composed of, for example, a buzzer or a warning lamp. The detection switches S21, S22, ..., S2n are of the ON/OFF type, being changeable between an ON position and an OFF position. The detection switches S21, S22, ..., S2n include door key switches for detecting whether door keys are in locked positions or unlocked positions, door position switches for detecting whether doors are closed or open, a bonnet position switch for detecting whether a bonnet is closed or open, and a trunk lid position switch for detecting whether a trunk lid is closed or open.

The automotive antitheft system can perform various types of vehicle control, such as warning inhibition control designed to prevent the generation of a warning when a vehicle driver is present in a vehicle interior, key lock prevention control designed to prevent the door keys from being locked under conditions where an engine key is inserted into a key box, and trunk lid control designed to open the trunk lid in response to switch operation by vehicle occupants. For these types of vehicle control, there are provided various actuators and operation switches S11, S12, ..., S1n. The actuators include a trunk lid opener 12 for opening the trunk lid, and a door lock controller 14 for locking and unlocking the door keys. The operation switches S11, S12, ..., S1n are of the ON/OFF type, being changeable between an ON position and an OFF position. The operation switches S11, S12, ..., S1n include an ignition switch which is changed between an ON position and an OFF position by the operation of the engine key, and a key detection switch for detecting that the engine key is inserted into the key box. The operation switches S11, S12, ..., S1n also include accessory switches.

First ends of the detection switches S21, S22, ..., S2n are grounded. Second ends of the detection switches S21, S22, ..., S2n are connected to a primary power supply line L1 via resistors R41, R42, ..., R4n respectively. The second ends of the detection switches S21, S22, ..., S2n are also connected to an input port of a microcomputer 20 via resistors R11, R12, ..., R1n respectively. The primary power supply line L1 leads from the positive terminal of a battery 16 via a detachable fuse 18. The negative terminal of the battery 16 is grounded. First terminals of the operation switches S11, S12, ..., S1n are connected in common to a primary power supply line L2 which leads from the positive terminal of the battery 16. Second terminals of the operation switches S11, S12, ..., S1n are connected to the input port of the microcomputer 20 via resistors R31, R32, ..., R3n respectively. In addition, the second terminals of the operation switches S11, S12, ..., S1n are grounded via resistors R21, R22, ..., R2n respectively. The warning device 10, the trunk lid opener 12, and the door lock controller 14 are connected to an output port of the microcomputer 20.

The input port of the microcomputer 20 receives output signals of the operation switches S11, S12, ..., S1n which assume high levels and low levels in accordance with the positions thereof. In addition, the input port of the microcomputer 20 receives output signals of the detection switches S21, S22, ..., S2n which assume high levels and low levels in accordance with the positions thereof.

The microcomputer 20 is programmed to execute the previously-mentioned various types of control such as the antitheft warning control and the warning inhibition control in response to the positions of the operation switches S11, S12, ..., S1n and the detection switches S21, S22, ..., S2n.

The microcomputer 20 includes C-MOS devices. In addition, the microcomputer 20 has protective diode Da1, Da2, ..., Dan for the C-MOS devices. The microcomputer 20 is connected to a secondary power supply line LVD to receive a stabilized power supply voltage VDD therefrom. The microcomputer 20 is activated by the stabilized power supply voltage VDD. Input signal lines LIN1, LIN2, ..., LINn extend from the operation switches S11, S12, ..., S1n into the microcomputer 20. The anodes of the protective diodes Da1, Da2, ..., Dan are connected to the input signal lines LIN1, LIN2, ..., LINn respectively. The cathodes of the protective diodes Da1, Da2, ..., Dan are connected to the secondary power supply line LVD. When the voltages of input signals at the input signal lines LIN1, LIN2, ..., LINn exceed the stabilized power supply voltage VDD by a given level (corresponding to the anode-cathode threshold voltage of the protective diodes Da1, Da2, ..., Dan), the protective diodes Da1, Da2, ..., Dan leak currents from the input signal lines LIN1, LIN2, ..., LINn to the secondary power supply line LVD to limit the voltages of the input signals and thereby to protect the C-MOS devices.

As described previously, the primary power supply line L1 leads from the positive terminal of the battery 16 via the detachable fuse 18. A power supply circuit 30 is connected between the primary power supply line L1 and the secondary power supply line LVD. The power supply circuit 30 derives the stabilized power supply voltage VDD from a primary power supply voltage at the primary power supply line L1.

The power supply circuit 30 is basically of the transistor-based emitter follower type. The power supply circuit 30 has a Zener diode ZD0, resistors R0 and R10, an NPN transistor TR0, a PNP transistor TR10, a diode D10, and a capacitor C0. The cathode of the Zener diode ZD0 is connected to the primary power supply line L1 via a current limiter formed by the resistor R0. The anode of the Zener diode ZD0 is grounded. The Zener diode ZD0 functions to provide a reference voltage V0 at the junction between the resistor R0 and the Zener diode ZD0. The base of the transistor TR0 is connected to the junction between the resistor R0 and the Zener diode ZD0. The collector of the transistor TR0 is connected to the primary power supply line L1. The emitter of the transistor TR0 is grounded via a voltage smoother formed by the capacitor C0. The emitter of the transistor TR0 leads to the secondary power supply line LVD. The anode of the diode D10 is connected to the junction between the resistor R0 and the Zener diode ZD0. The cathode of the diode D10 is grounded via a current limiter formed by the resistor R10. The base of the transistor TR10 is connected to the junction between the diode D10 and the resistor R10. The emitter of the transistor TR10 is connected to the emitter of the transistor TR0. The collector of the transistor TR10 is grounded.

As described previously, the power supply circuit 30 derives the stabilized power supply voltage VDD from the primary power supply voltage at the primary power supply line L1. The stabilized power supply voltage VDD (equal to, for example, 5 V) is given by an emitter voltage which equals the reference voltage V0 of the Zener diode ZD0 minus the base-emitter threshold voltage (about 0.7 V) of the transistor TR0.

When the protective diodes Da1, Da2, ..., Dan leak currents from the input signal lines LIN1, LIN2, ..., LINn to the secondary power supply line LVD, the secondary power supply voltage VDD rises. The rise in the secondary power supply voltage VDD is limited as follows. A voltage at the junction between the diode D10 and the resistor R10 provides a reference voltage V1 which equals the reference voltage V0 of the Zener diode ZD0 minus the anode-cathode threshold voltage (about 0.7 V) of the diode D10. The reference voltage V1 is applied to the base of the transistor TR10. Thus, the transistor TR10 functions to limit the secondary power supply voltage VDD within a range not higher than a given voltage which equals the sum of the reference voltage V1 and the emitter-base threshold voltage (about 0.7 V) of the transistor TR10.

During the shipment of the vehicle from a factory, the fuse 18 is generally removed to suspend the feed of electric power from the battery 16 to the primary power supply line L1 and thereby to prevent the electric power of the battery 16 from being consumed by the microcomputer 20. In this case, the reference voltage V0 of the Zener diode ZD0 is absent so that the power supply circuit 30 does not generate the stabilized power supply voltage VDD. In addition, the voltage at the junction between the diode D10 and the resistor R10, that is, the base voltage of the transistor TR10, provides a reference voltage V2 which equals the ground potential (0 V). It is now assumed that at least one of the operation switches S11, S12, ..., S1n is closed and thus related one of the protective diodes Da1, Da2, ..., Dan leaks a current from related one of the input signal lines LIN1, LIN2, ..., LINn to the secondary power supply line LVD. It should be noted that the operation switches S11, S12, ..., S1n are connected to the primary power supply line L2 which remains in connection with the battery 16. Under the conditions where the fuse 18 is removed, the leak current increases the voltage at the secondary power supply line LVD. When the voltage at the secondary power supply line LVD reaches the emitter-base threshold voltage (about 0.7 V) of the transistor TR10, the leak current escapes from the secondary power supply line LVD to the ground via the emitter-collector path of the transistor TR10. As a result, under conditions where the fuse 18 is removed, the voltage at the secondary power supply line LVD is limited to within a given range not higher than the emitter-base threshold voltage (about 0.7 V) of the transistor TR10.

As described previously, under conditions where the fuse 18 is set in position so that the primary power supply line L1 is subjected to the primary power supply voltage, the power supply circuit 30 derives the stabilized power supply voltage VDD from the primary power supply voltage at the primary power supply line L1. Under these conditions, the transistor TR10, the diode D10, and the resistor R10 cooperate to limit the secondary power supply voltage VDD within a range not higher than a given voltage which equals the sum of the reference voltage V1 and the emitter-base threshold voltage (about 0.7 V) of the transistor TR10. Thus, the secondary power supply voltage VDD is prevented from being excessively increased by leak currents through the protective diodes Da1, Da2, ..., Dan so that the C-MOS devices within the microcomputer 20 are protected and that the microcomputer 20 is prevented from operating abnormally.

As described previously, under conditions where the fuse 18 is removed so that the power supply circuit 30 does not generate the stabilized power supply voltage VDD, even when the protective diodes Da1, Da2, ..., Dan leak currents from the input signal lines LIN1, LIN2, ..., LINn to the secondary power supply line LVD, the transistor TR10 and the resistor R10 cooperate to limit the voltage at the secondary power supply line LVD to within a given range not higher than the emitter-base threshold voltage (about 0.7 V) of the transistor TR10. Thus, under these conditions, the microcomputer 20 is prevented from undesirably operating.

It is unnecessary to provide a buffer including a transistor (the transistor TR1 in FIG. 2 or 3) at each of the input signal lines LIN1, LIN2, ..., LINn, so that the apparatus can be simple and compact.

Figure 5:
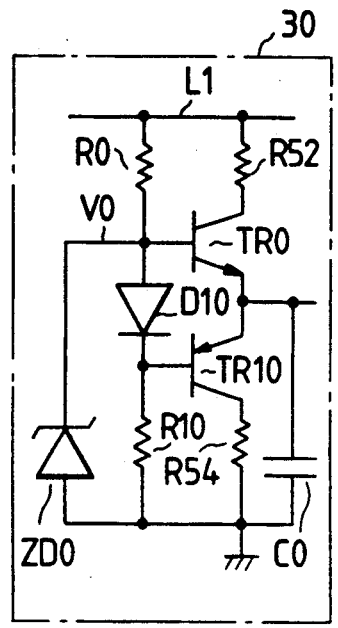
FIG. 5 is a schematic diagram of a first modified power supply voltage control apparatus according to this invention.

FIG. 5 shows a first modification of the embodiment of FIG. 4. As shown in FIG. 5, the first modification additionally includes current limiting resistors R52 and R54 in a power supply circuit 30. The current limiting resistor R52 is connected between the collector of a transistor TR0 and a primary power supply line L1. The current limiting resistor R54 is connected between the collector of a transistor TR10 and the ground. It should be noted that one of the current limiting resistors R52 and R54 may be omitted.

Figure 6:
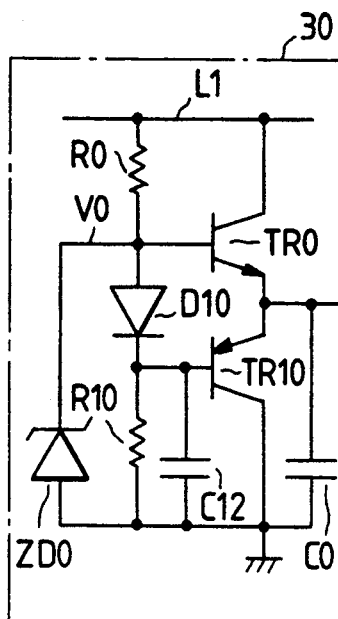
FIG. 6 is a schematic diagram of a second modified power supply voltage control apparatus according to this invention.

FIG. 6 shows a second modification of the embodiment of FIG. 4. As shown in FIG. 6, the second modification additionally includes a capacitor 12 connected in parallel with a resistor R10. When the feed of electric power from a battery 16 (see FIG. 4) to a primary power supply line L1 is interrupted by some cause, the capacitor C12 prevents a voltage at the junction between a diode D10 and the resistor R10 from immediately dropping to a reference voltage V2. Thus, the capacitor C12 prevents an immediate decrease in the power supply voltage VDD and also immediate interruption of the feed of electric power to a microcomputer 20 (see FIG. 4).

Figure 7:
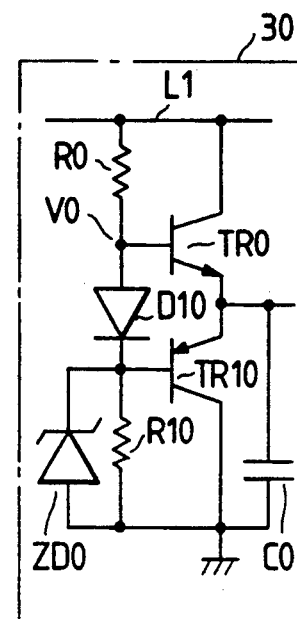
FIG. 7 is a schematic diagram of a third modified power supply voltage control apparatus according to this invention.

FIG. 7 shows a third modification of the embodiment of FIG. 4. As shown in FIG. 7, in the third modification, the cathode of a Zener diode ZD0 is connected to the junction among a diode D10, a resistor R10, and the base of a transistor TR10. A reference voltage V1 is provided by the Zener diode ZD0. A reference voltage V0 is given by the sum of the reference voltage V1 and the anode-cathode threshold voltage of the diode D10.

Figure 8:
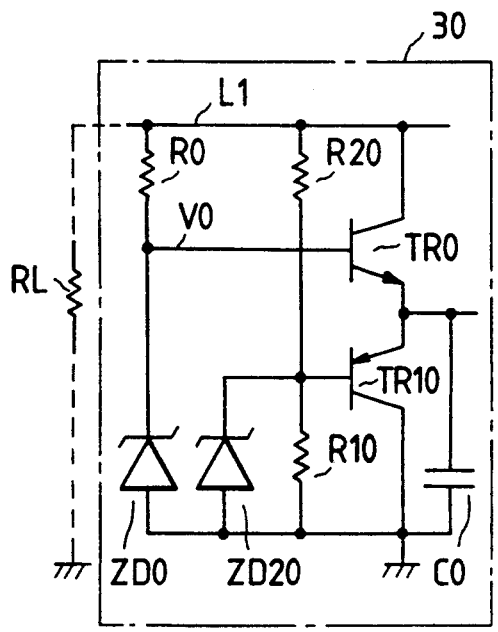
FIG. 8 is schematic diagram of a fourth modified power supply voltage control apparatus according to this invention.

FIG. 8 shows a fourth modification of the embodiment of FIG. 4. As shown in FIG. 8, in the fourth modification, a diode D10 (see FIG. 4) is omitted from a power supply circuit 30 while a Zener diode ZD20 and a resistor R20 are added to the power supply circuit 30. The cathode of the Zener diode ZD20 is connected to the base of a transistor TR10. The anode of the Zener diode ZD20 is grounded. The junction among the Zener diode ZD20, the base of the transistor TR10, and a resistor R10 is connected via the resistor R20 to a primary power supply line L1. A reference voltage V1 is provided by the Zener diode ZD20.

Figure 9:
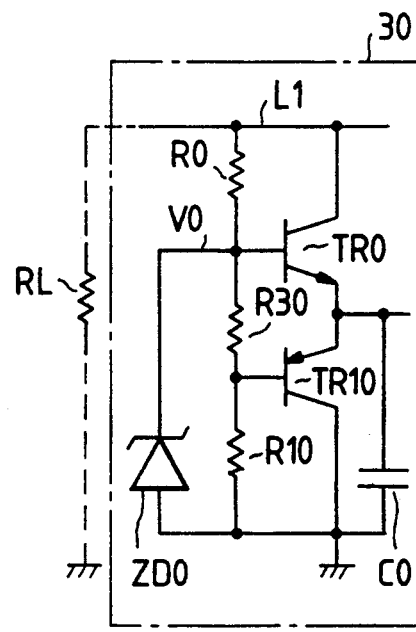
FIG. 9 is a schematic diagram of a fifth modified power supply voltage control apparatus according to this invention.

FIG. 9 shows a fifth modification of the embodiment of FIG. 4. As shown in FIG. 9, the fifth modification uses a resistor R30 in place of a diode D10 (see FIG. 4). A reference voltage V0 is divided by a combination of the resistor R30 and a resistor R10, thereby generating a reference voltage V1.

In the case where the base of the transistor TR10 and the primary power supply line L1 are connected via the resistor or resistors as in the modifications of FIGS. 8 and 9, when a load RL is connected between the primary power supply line L1 and the ground in a region outside the power supply circuit 30, the base of the transistor TR10 is gounded via the above-mentioned resistor or resistors, the primary power supply line L1, and the load RL. In this case, it is possible to omit the grounding resistor R10 for generating the reference voltage V2 in the absence of the feed of electric power to the primary power supply line L1.

What is claimed is:

1. A power supply voltage control apparatus comprising:

first, second, and third power supply lines being separate from each other;

a power supply circuit, being connected between the first power supply line and the third power supply line and receiving electric power from the first power supply line, for generating a given power supply voltage from the received electric power, and for outputting the generated power supply voltage to the third power supply line;

an electronic circuit being connected to the third power supply line and receiving the power supply voltage from the third power supply line to be activated by the received power supply voltage, the electronic circuit having an input section for receiving an input signal from the second power supply line, the electronic circuit operating on the input signal;

a protective circuit, being provided in the electronic circuit, for leaking a current from the input section of the electronic circuit toward the third power supply line when a voltage of the input signal exceeds the power supply voltage;

reference voltage generating means, being connected to the first power supply line, for generating a first reference voltage in the presence of the electric power fed from the first power supply line to the power supply circuit, and for generating a second reference voltage in the absence of the electric power fed from the first power supply line to the power supply circuit, the second reference voltage being lower than the first reference voltage; and voltage limiting means, connected to the third power supply line and the reference voltage generating means to be responsive to the first and second reference voltages, for limiting a voltage of the third power supply line to below a level approximately equal to the first or second reference voltage.

2. The power supply voltage control apparatus of claim 1, wherein the reference voltage generating means comprises charging/discharging means, connected to the first power supply line to be charged by electric power fed from the first power supply line, for maintaining generation of the first reference voltage when the feed of the electric power from the first power supply line becomes absent.

3. In a system comprising first, second, and third power supply lines being separate from each other; an electric power source connected to the first and second power supply lines; a power supply circuit, being connected between the first power supply line and the third power supply line and receiving first electric power from the electric power source via the first power supply line, for deriving a power supply voltage from the received first electric power, and for outputting the derived power supply voltage to the third power supply line; input signal generating means, being connected to the second power supply line and receiving second electric power from the electric power source, for generating an input signal from the received second electric power; an electronic circuit being connected to the third power supply line and receiving the power supply voltage from the third power supply line to be activated by the received power supply voltage, the electronic circuit having an input section connected to the input signal generating means for receiving the input signal therefrom, the electronic circuit operating on the input signal; a protective circuit, being provided in the electronic circuit, for leaking a current from the input section of the electronic circuit toward the third power supply line when a voltage of the input signal exceeds the power supply voltage; a power supply voltage control apparatus comprising:

means for, in cases where the power supply circuit normally operates to generate the power supply voltage, limiting the power supply voltage to below a first given level even when the protective circuit leaks a current from the input section of the electronic circuit toward the third power supply line; and means for, in cases where the power supply circuit fails to generate the power supply voltage, limiting a voltage at the third power supply line to below a second given level even when the protective circuit leaks a current from the input section of the electronic circuit toward the third power supply line, the second given level being lower than the first given level.

4. The power supply voltage control apparatus of claim 3, further comprising means for, in cases where connection of the power supply circuit to the electric power source via the first power supply line breaks so that feed of the first electric power to the power supply circuit from the electric power source becomes absent, enabling the power supply circuit to maintain generation of the power supply voltage for a given time.

* * * * *